3,275,567
METHOD OF PREPARING A SULFIDED PLATINUM ON CARBON CATALYST
Carl D. Keith, Summit, and Daniel L. Bair, Roselle Park, N.J., assignors to Engelhard Industries, Inc., Newark, N.J., a corporation of Delaware
No Drawing. Filed June 27, 1963, Ser. No. 290,931
3 Claims. (Cl. 252—439)

This invention relates to catalysts and more especially to a novel method for preparing a new and improved catalyst especially well suited for catalyzing the reductive alkylation of an aryl amine with an aliphatic ketone, and the catalyst per se.

The reductive alkylation of an arylamine, for instance p-phenylene diamine, with an aliphatic ketone, for instance acetone, is effected in the presence of a catalyst and yields valuable products, for instance N,N,N',N'-tetraisopropyl-p-phenylene diamine with the above-specified reactants, which is well suited for use as an additive to synthetic lubricants and greases as a deterioration stabilizer or inhibitor. The reductive alkylation is carried out at a temperature of from about 125° C.–300° C., preferably from about 150° C.–250° C., pressures of from about 100–3000 p.s.i.g., and in the presence of hydrogen. The contact time is dependent on whether batch or continuous operation is utilized and may range from 15 minutes to about 24 hours or longer. An excess of hydrogen is generally employed and may range up to 20 or more moles of hydrogen per mole of the p-phenylene diamine. The reductive alkylation and synthetic lubricants and greases stabilized against deterioration by the product thereof are disclosed in U.S. Patent 3,078,229.

Catalysts utilized heretofore for such reductive alkylation reaction have included supported platinum, palladium and platinum-rhodium mixture, all of these catalysts being unsulfided. These catalysts have not been entirely satisfactory for the reaction for the reason the selectivity to the desired product, i.e. the yield of desired product formed from the reactants, has been materially lower than desired.

In accordance with the present invention, a new and improved catalyst is prepared by a novel procedure involving, in its broader aspects, slurrying a reduced platinum, i.e. metallic platinum, on solid carrier particles such as carbon particles, in a liquid, for instance water, followed by treating the resulting slurry with a sulfiding agent, for instance $H_2S$, to sulfide the platinum on the carbon, i.e. convert the platinum to a sulfide of platinum. The carbon particles having the sulfide of platinum supported thereon are then separated from the liquid, for instance by filtration. It has been found that such catalyst is especially well suited for catalyzing the reductive alkylation of an arylamine with an aliphatic ketone, achieving, in relatively short reaction time, a very high selectivity to the desired product—higher than that provided by the unsulfided platinum, palladium, and platinum-rhodium catalysts. The catalyst of this invention achieves a selectivity to the desired product in the reductive alkylation mentioned supra of about 98% or higher, whereas such selectivity with the prior art catalysts previously mentioned is usually only about 75–80%.

It is essential for preparation of the superior catalysts of this invention that the support material be carbon and that the supported platinum is reduced prior to sulfiding. The reasons for this are that support materials other than carbon such as, for instance, alumina, silica-alumina and diatomaceous earth are unsatisfactory since too long a time is required, when such other support materials are used, for completion of the reductive alkylation reaction of the arylamine with the aliphatic ketone. Sulfiding of an unreduced platinum on carbon, i.e. a compound of platinum and usually an oxide of platinum, resulted in a catalyst which was also not good for catalyzing the reductive alkylation because too long a time was required to complete the reductive alkylation, and hence the essentiality of the reduced platinum which is sulfided on the carbon.

The reduced platinum on carbon for the sulfiding can be prepared by hydrolyzing a compound of platinum with the platinum in the two valent state in the compound, in an aqueous solution in the presence of the carbon particles. As a result of the hydrolysis, an oxide of the platinum is precipitated on the surface of the carbon particles. The oxide of platinum is then reduced to platinum metal.

As exemplary of the preparation of the reduced platinum on carbon, the carbon particles, which are preferably of the particle size hereinafter set forth, are admixed with an aqueous solution of chloroplatinous acid ($H_2PtCl_4$). An aqueous solution of an alkaline material such as, for instance, sodium hydroxide or sodium carbonate is added to the admixture and the resultant slurry is heated to a temperature in the range of about 50°–100° C., preferably about 70°–100° C., to effect hydrolysis and deposition of the platinum as a platinum oxide on the carbon support. The platinum oxide on carbon support is then reduced to platinum metal by treatment by admixing or otherwise with an aqueous solution of formic acid, sodium formate or formaldehyde, at elevated temperature, typically about 100° C. Alternatively the reduction can be effected by contacting the platinum oxide on carbon with a reducing gas such as $H_2$ at temperature in the range of about 100°–250° C. and pressure of about 0–2000 p.s.i.g. The thus-obtained product is then preferably washed prior to sulfiding the platinum.

For maximum activity of the product sulfided catalyst, the reduced platinum metal, prior to sulfiding, should have an average crystallite size of less than 100 Angstrom units and preferably less than 60 A. as measured by X-ray diffraction. Such crystallite size of the platinum is attained by hydrolyzing the platinous salt, for instance the platinous chloride, to the oxide or oxide hydrate prior to the reduction.

The reduction to metallic platinum is essential herein to attain a catalyst of improved activity in accordance with this invention. As shown by comparative test data hereinafter set forth, the sulfided platinum on carbon in which the platinous oxide had been reduced to platinum prior to sulfiding in accordance with this invention had a considerably greater activity than the sulfided platinum on carbon not reduced prior to sulfiding.

The reduced platinum on carbon preferably has a platinum metal content from about 4%–8% by weight (based on metal plus support) prior to the sulfiding.

The reduced platinum on carbon particles are slurried in water, preferably in a weight ratio of the platinum on carbon particles (dry basis) to water within the range of about 1:3 to about 1:20 respectively. The resulting slurry is then treated with a water-soluble sulfiding agent, e.g. $H_2S$, preferably by passing the $H_2S$ gas into the slurry at room temperature. Temperatures of from room temperature to about 50° C. are preferably employed. Exemplary of other water-soluble sulfiding agents utilizable in place of the $H_2S$ are ammonium, sodium and potassium sulfides, and acid sulfides, e.g. sodium hydrogen sulfide, and polysulfides, e.g. ammonium polysulfide. The $H_2S$ is introduced into the slurry gradually and typically over a period of about fifteen minutes. The $H_2S$ is preferably added in excess over the theoretical amount required for reaction with the platinum to form platinum disulfide, for instance, a 100 percent excess over the theoretical amount to form $PtS_2$.

The carbon particles having the sulfided platinum thereon are then separated from the aqueous liquid, for instance by filtration.

The particulate carbon support of the catalyst of this invention preferably is of particle size such that a minimum 50% of the particles, have particle size or diameter less than 20 microns, i.e. not less than 50% of the particles are of size less than 20μ. An especially preferred particle size of the carbon is 50–80% of particles of size less than 20 microns. The carbon should be free or substantially free of particles of size less than 1 micron. With carbon particles of size within the range specified immediately above, a higher level of activity and also good filtration recovery of the supported catalyst particles is achieved from the liquid phase reaction mixture in the reductive alkylation reaction. The presence of a major portion of the carbon particles of size larger than 20 microns results in a lower activity of the catalyst, while with much more than 80% of the particles of size smaller than 20 microns, the activity is improved but filtration recovery of the particles from the liquid reaction mixture of the reductive alkylation is difficult. The carbon support is also characterized by having, prior to deposition of the platinum thereon, a surface area greater than 800 m.$^2$/g., preferably in the range of about 1000–1600 m.$^2$/g.

The following examples and comparative test data further illustrate the invention. Parts and percentages are by weight unless otherwise specified.

EXAMPLE I

A reduced 5% platinum on particulate carbon, having an average platinum crystallite size of <60 A., was slurried in 10 parts of water at room temperature. One part dry basis of the platinum on carbon was utilized, and the platinum on carbon was previously reduced to metallic platinum on the carbon by treatment with aqueous sodium formate solution. H$_2$S gas was passed into the slurry at room temperature over a period of fifteen minutes. The H$_2$S was supplied in a 100% excess over the theoretical amount required to convert the metallic platinum to PtS$_2$. The sulfided platinum on carbon was then separated from the liquid by filtration.

EXAMPLE II

*Part A.*—An unreduced 5% platinum on particulate carbon in amount of 1 part (dry basis) was slurried in 10 parts of water at room temperature. The platinum on carbon was not previously reduced, and the platinum was present at least in material amount as an oxide of platinum. H$_2$S was bubbled into the slurry at room temperature over a 15 minute period. The H$_2$S was supplied in a 100% excess over the theoretical amount required to convert the platinum to PtS$_2$. The sulfided platinum on carbon was then separated from the liquid by filtration.

The particulate carbon support of Examples I and II was derived from a soft wood, had a surface area, prior to deposition of the platinum oxide thereon, of about 1200 m.$^2$/g., and had particle size as follows:

| Microns: | Percent |
| --- | --- |
| 1–10 | 35 |
| 10–20 | 36 |
| 20–30 | 15 |
| 30–40 | 8 |
| >40 | 6 |

*Part B.*—Catalyst of each of Examples I and II were then tested for the reductive alkylation of p-amino diphenylamine with methylisobutyl ketone in the presence of hydrogen. Each test run was made in an autoclave with 21.4 grams of p-amino diphenylamine and 43.5 ml. of methylisobutyl ketone in the presence of hydrogen, and 0.32 gram (on dry basis) of each of the sulfided reduced platinum on carbon and the sulfided unreduced platinum on carbon. The reaction temperature was 180° C.–185° C., and the pressure in the autoclave was 400–600 p.s.i.g. Absorption of H$_2$ stopped completely when the reaction was over in each test, and an approximately theoretical yield of the desired product was obtained in each run. The results follow:

*Table I*

| Test | Catalyst | Reaction Time (Minutes) |
| --- | --- | --- |
| 1 | Sulfided reduced platinum on carbon of Example I. | 40 |
| 2 | Sulfided unreduced platinum on carbon of Example II. | 115 |

The data of Table I evidences the superiority of the sulfided reduced platinum on carbon of Test Run 1 over the sulfided unreduced platinum on carbon of Test Run 2. The reaction time to the desired product with the sulfided reduced platinum on carbon of this invention was only about one-third the reaction time required with the sulfided unreduced platinum on carbon.

EXAMPLE III

*Part A.*—Separate lots of sulfided platinum on carbon catalysts were prepared following the preparation procedure of Example I except that one lot contained 2% metallic platinum on carbon prior to the slurrying and sulfiding, the second lot contained 5% metallic platinum on carbon prior to the slurrying and sulfiding, and the third lot contained 10% metallic platinum on carbon prior to the steps mentioned above.

*Part B.*—Portions of each lot containing equivalent amounts of Pt were utilized for the reductive alkylation of p-amino diphenylamine with methylisobutyl ketone in the presence of hydrogen following the reductive alkylation method set forth in Example II, Part B. The reaction time, i.e. time required for completion of the reaction to obtain the desired product, was noted for each run. The results are tabulated in Table II below:

*Table II*

| Test | Catalyst | Percent pt metal prior to sulfiding | Relative reaction time required to complete the reductive alkylation |
| --- | --- | --- | --- |
| 1 | Sulfided metallic platinum on carbon. | 2 | 9 |
| 2 | ----do---- | 5 | 1 |
| 3 | ----do---- | 10 | 3½ |

The results of the foregoing Table II show that the catalyst containing 2% platinum (Test 1) required 9 times as much time for completion of the reaction to the desired product as the catalyst containing 5% Pt (Test 2), and the 10% Pt catalyst (Test 3) required 3½ times as much time to complete the reaction as the 5% Pt catalyst of Test 2.

While not known with certainty, it is believed that only the outermost atoms of platinum on the carbon particles are sulfided, and that the inner atoms of platinum are unsulfided platinum metal. The sulfur content of the 5% Pt sulfided catalyst of this invention is typically about 1–3 weight percent (dry basis).

It will be obvious to those skilled in the art that many modifications may be made within the scope of the present invention without departing from the spirit thereof and this invention includes all such modifications.

What is claimed is:

1. A method for preparing a sulfided platinum on carbon catalyst which comprises admixing particulate carbon with an aqueous solution of a compound of platinum with platinum in the two-valent state, treating the resultant slurry with an alkaline material to effect hydrolysis and deposition of the platinum as a platinum oxide on the carbon support, reducing the supported platinum oxide to metallic platinum in an aqueous slurry, treating the metallic platinum on carbon in an aqueous slurry with a sulfiding agent to convert the platinum on carbon to a sulfide of platinum, and separating the carbon particles having the sulfide of platinum thereon.

2. The method of claim 1 wherein the compound of platinum is chloroplatinous acid.

3. A catalyst prepared in accordance with the process of claim 1.

References Cited by the Examiner

UNITED STATES PATENTS

| | | | |
|---|---|---|---|
| 2,207,868 | 7/1940 | Martin | 252—472 |
| 2,475,155 | 7/1949 | Rosenblatt | 252—472 |
| 2,659,701 | 11/1953 | Heard et al. | 252—439 |
| 2,863,825 | 12/1958 | Engel | 252—439 X |
| 2,985,699 | 5/1961 | Schwartz et al. | 252—439 X |

FOREIGN PATENTS

| | | |
|---|---|---|
| 163,254 | 6/1955 | Australia. |
| 222,042 | 1/1958 | Australia. |

OSCAR R. VERTIZ, *Primary Examiner.*

MAURICE A. BRINDISI, BENJAMIN HENKIN,
*Examiners.*

R. M. DAVIDSON, A. GREIF, *Assistant Examiners.*